Dec. 6, 1932.                H. ALFARO                1,890,012
                              AIRPLANE
                  Filed Sept. 22, 1928    2 Sheets-Sheet 1

INVENTOR
Heraclio Alfaro
BY
Evans & McCoy
ATTORNEYS

Dec. 6, 1932.   H. ALFARO   1,890,012
AIRPLANE
Filed Sept. 22, 1928   2 Sheets-Sheet 2

INVENTOR
Heraclio Alfaro
BY
Evans & McCoy
ATTORNEYS

Patented Dec. 6, 1932

1,890,012

UNITED STATES PATENT OFFICE

HERACLIO ALFARO, OF EAST CLEVELAND, OHIO

AIRPLANE

Application filed September 22, 1928. Serial No. 307,705.

This invention relates to airplanes and more particularly to airplane wings and airplane control surfaces, and has for its object to provide an improved system of rolling control.

In airplanes, it has been found advantageous to use wings in which the ratio of maximum lift to minimum drag obtainable is large. Flaps are used to increase the ratio in a normal wing by increasing at will the maximum lift obtainable without increasing the minimum drag appreciably. Variable camber and variable area wings are used to obtain also a higher value of this ratio by the same procedure.

In most of these cases, however, the space required by the rolling control elements conflicts with the size of the flap and a compromise must be worked out by which part of the wing space only is provided with a flap or other lift increasing elements, leaving the remaining space for the rolling control units.

Thus in a flap wing using the common aileron type of flap, part of the span only, usually the center, is provided with a flap. The remaining portions of the wing, usually near the tips, are provided with ailerons for rolling control. This compromise sacrifices part of the efficiency of the lift increasing elements in order to obtain an operative rolling control.

In other cases, the portions of the wing near the tips are provided with ailerons which move down with the flap, but which can be offset angularly with respect to each other in an attempt to provide an efficient flap and operative lateral or rolling control. This arrangement, however, does not provide satisfactory control in all the flying attitudes of an aircraft.

In other cases, slotted ailerons, sliding flaps, or a movable wing nose may conflict with lateral control elements and cannot be applied to the whole span of aircraft wings.

An object of this invention is to provide lift increasing devices of maximum efficiency in aircraft wings.

Another object of my invention is to provide rolling control elements that will not encroach upon the space required for lift increasing devices of maximum efficiency.

Still another object of the invention is to provide efficient lift increasing devices in airplane wings which do not interfere with efficient rolling control elements, which will be operative throughout a large range of flying attitudes and of such character that the yawing moment created by its operation is advantageous, and furthermore, of such a character that the combination of lift increasing devices of high efficiency with the rolling control elements will not interfere with the efficient operation of either.

In the following description, the term "whole span flap" will be understood to refer to a flap not restricted in size by rolling control surfaces or other accessory parts, but it does not necessarily mean that the flap must extend the entire length or span of the wing.

Thus, the tips of a wing may be rounded and, for convenience of construction, the ends of the flap may lie within the rounded corners of the wing tips as shown in Fig. 1 of my patent application Serial No. 236,342 filed Nov. 28, 1927. In other instances, the flap may be interrupted to leave the space required for the width of the body of the airplane or of the engine nacelles and still be within the meaning of the term "whole span flap." Furthermore, the length of wing tip ailerons is not considered as included in the span of a wing.

In the drawings, Figure 1 shows in perspective, a wing, with a flap and rolling control elements embodying the invention.

My invention contemplates an advantageous arrangement of the lift increasing devices and rolling control elements of an aircraft wing by which both may operate with maximum efficiency. I have found that by using a whole span flap, I can take full advantage of the lift increasing virtues of flap wings and that, by locating the rolling control elements elsewhere, I can obtain satisfactory rolling control without hampering the efficiency of the lift increasing elements. Furthermore, I found that I can advantageously use wing tip ailerons in flap wings combined with lift spoilers, thereby obtaining efficient control within a large range of flying attitudes and also advantageous yawing moments due to the combined operation of the ailerons and lift spoilers.

In addition, I have found that the use of wing tip ailerons has further advantages in increasing the efficiency of the aircraft due to the slight increase in the effective span. I have also found that the manual effort required in the actuation of this combined control is relatively small.

Figure 1:
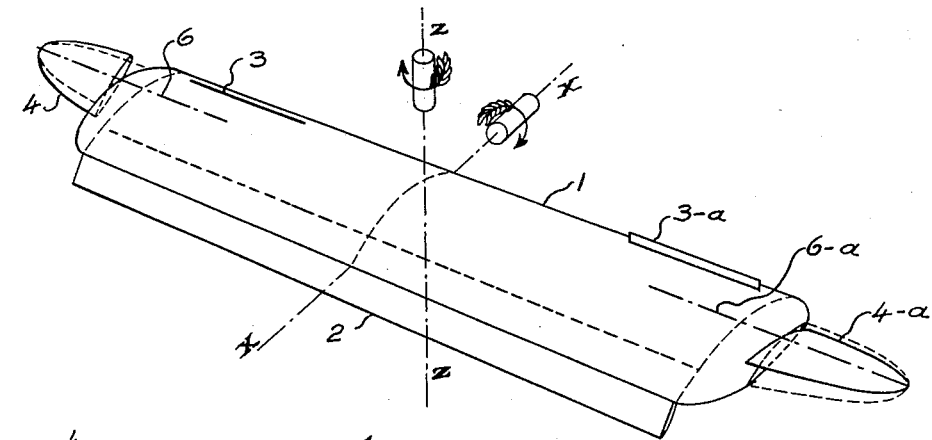
Figure 2:
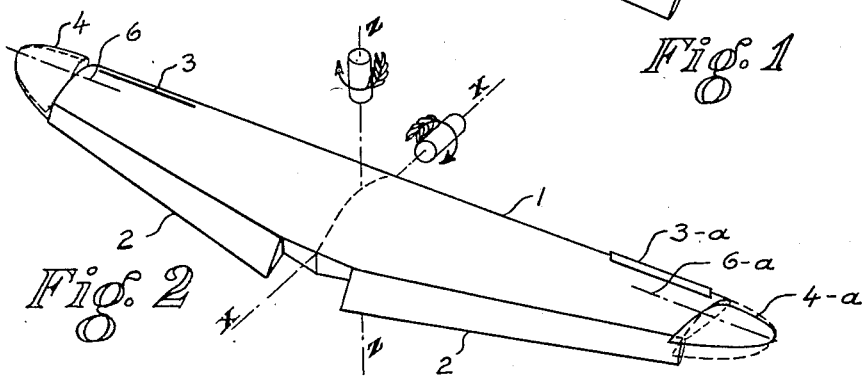
Fig. 2 shows also in perspective, a taper wing, a flap, and rolling control elements as another modification of my invention.

There is illustrated in Figs. 1 and 2 of the drawings, a wing 1, a whole span swinging and sliding flap 2 of the type described in my copending application Serial No. 236,342, filed Nov. 28, 1927, lift spoiler plates 3 and 3a and wing tip ailerons 4 and 4a pivoted about axes 6 and 6a.

In Fig. 2, the space 5 is cut from the flap to allow room for the body of the aircraft.

In wings of rectangular form with rounded tips, I prefer to use an aileron of a shape such as shown in Fig. 1, while in taper wings, ailerons of the shape shown in Fig. 2 may be preferred. Other shapes of aileron which may be employed are shown in Figs. 3, 4 and 5.

In Figs. 1 and 2, the controlling devices are shown in operation. The rolling moment created when the control devices are shifted to the positions shown in full lines in Fig. 1 tends to start a rolling movement about the axes X—X indicated in said figure in the direction indicated by the arrow. The relative size of the spoiler plates and of the tip ailerons will preferably be such that when operated as shown, there will be a tendency to start rotation in yaw about the axis indicated at Z—Z in Fig. 1 in the direction indicated by the arrow; or at least the relative size should be such that the usual tendency to rotate in a direction opposite to that shown will be minimized. Flap 2 is shown in an extended position to increase the lift.

Figure 3:
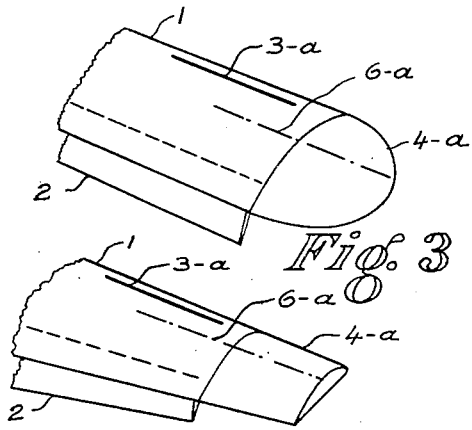
Figs. 3, 4 and 5 show modified forms of wing tip ailerons.
Figure 4:
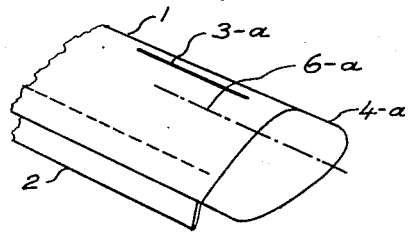
Figure 5:

Figs. 3, 4 and 5 show ailerons and spoilers in neutral positions and flap 2 in an extended position. Ailerons such as shown in Figs. 3 and 4 may be advantageously used at the tip of rectangular wings, while the aileron shown in Fig. 5 is of a form suitable for use with taper wings.

Figure 7:
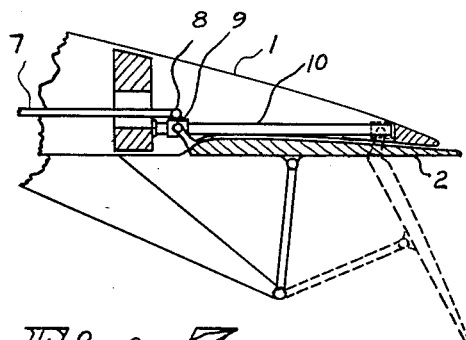
Fig. 7 is a transverse section through the flap.

As shown in Fig. 7 of the drawings, the flap 2 may be operated by a suitable connecting rod 7 extending from a suitable manually operated controlling member and connected by a pivot 8 to one of several sleeves or bushings 9 to which the front end of the flap 2 is pivoted. The sleeves 9 are slidable on guide rods 10 which are preferably of tubular form and which are fixed to the body of the wing. As the flaps 2 are moved rearwardly by means of the rod 7, they are constrained to swing downwardly by arms 2a pivoted to the body of the wing and to the flap.

Figure 6:
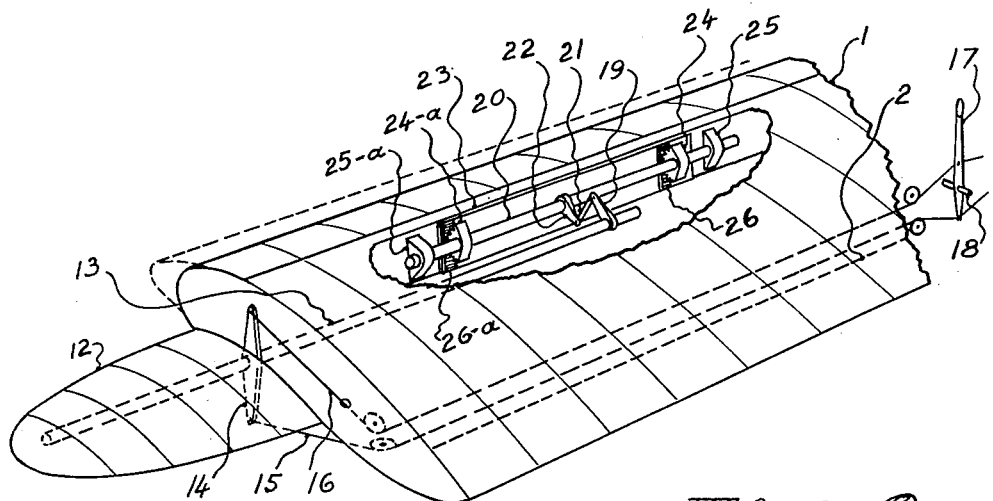
Fig. 6 is a perspective view of a wing showing mechanism for the simultaneous operation of the ailerons and lift spoilers.

In Fig. 6 of the drawings, there is illustrated one means of simultaneously actuating the ailerons and spoiler plates, one end only of the wing being shown. As shown in Fig. 6, an aileron 12 is mounted beyond the wing tip on a shaft 13 which extends longitudinally into the interior of the wing and which is journaled in suitable bearings in the wing. A lever 14 fixed at its center to the shaft 13 and cables 15 and 16 secured to opposite ends of the lever 14 govern the movements of the aileron 11. The cables 15 and 16 extend over suitable guides to an actuating lever 17 pivoted at 18 and positioned at a central point where it is within convenient reach of the pilot.

As will be readily understood, the rolling control devices shown in Fig. 6 are duplicated at the opposite end of the wing and are actuated simultaneously with the devices shown but in the opposite direction by the lever 17.

Within the wing, the shaft 13 has fixed thereto an arm 19 which imparts rotative movements to a shaft 20 through a link 21 which is pivoted at one end to the arm 19 and at its opposite end to the arm 22 fixed to the shaft 20. The shaft 20 actuates a vertically movable spoiler plate 23 through gear segments 24 and 24a fixed to the shaft. The shaft 20 is journaled in bearings 25 and 25a fixed to the frame of the wing body and the segments 24 and 24a mesh with racks 26 and 26a fixed to the rear face of the plate 23.

In normal flying, the control lever 17 is in neutral position and the ailerons are positioned at substantially the same angle to the wind direction as the wings and the lift spoiler plates are confined within the wing contour.

By operating the lever 26, rotative movements are imparted to the ailerons, one in one direction and the other in the opposite direction, thereby imparting a rolling moment to the plane. Vertical movement is simultaneously imparted to the spoiler plates and the linkages are so arranged that a spoiler plate will be projected out of the wing profile only when the adjacent aileron is rotated in the direction to reduce the lift. The effect of the projecting spoiler plate 23 is to disturb the airflow and cause a reduction of lift in the part of the wing in which said plate is mounted.

The aggregate effect of the movements of the aileron and spoiler plate in the directions above mentioned is to increase the reduction of lift.

The aileron is more effective as a rolling control element when the wings are placed at small angles of attack and the flying speed is high. The spoiler plate is more effective as a lift reducing element when the angle of attack is high. The combined action of the ailerons and spoiler plate is therefore highly advantageous in that they provide effective rolling control throughout a larger range of flying attitudes than either device used alone.

Moreover, the combined action of the ailerons and the spoiler plates as above described considerably improves the yawing effect due to the operation of the rolling controls. When a spoiler plate protrudes from the top of the wing, the drag of that portion of the wing increases. While at the opposite end of the wing, the motion of the spoiler plate is in a reverse direction and the drag remains practically unchanged. The ailerons at the opposite ends of the wing are actuated in opposite directions so that one increases its angle of attack while the other reduces its angle of attack. The aileron having a larger angle causes a greater drag and this increased drag causes a yawing moment.

The yawing moment caused by the operation of the ailerons is opposite that due to the movements of the spoiler plates and for this reason, the yawing effect of the spoiler plates tends to neutralize the yawing effect of the ailerons. This yawing effect can be nearly neutralized by properly proportioning the sizes and movements of the spoiler plates.

I prefer to obtain a larger yawing moment from the plates than from the ailerons so that the yawing moment resulting from the combined action of both will be in a reverse direction to the usual yawing moment created by the orthodox aileron type of rolling control when in operation.

Spoiler plates 3 and 3a may be omitted in case that, the control obtained without their addition is considered satisfactory. The use of spoiler plates is not so essential with wing tip ailerons of the feathering type, wherein the ailerons are normally freely rotated about their axes by the wind so as not to furnish any appreciable lift, both ailerons following the direction of the air stream. The operator can, however, rotate the ailerons in opposite directions to dispose them at opposite inclinations with respect to the air stream and obtain the desired rolling control. This type of aileron is not per se new and requires no further explanation. It is, however, new as here applied. It gives effective response within a large range of flying attitudes but the ailerons must have a fairly large area. By employing spoiler plates in connection with the wing tip ailerons, ailerons of small size may be employed since their controlling action is required only when flying at high speed. For slow flying, the spoiler plates alone furnish satisfactory rolling control.

The spoiler plates described are easily operated since a small resistance only needs to be overcome. Because of the small size of the wing tip ailerons, little force is required for their operation and the spoiler plates and ailerons may be operated simultaneously with relatively little manual effort.

Figure 8:
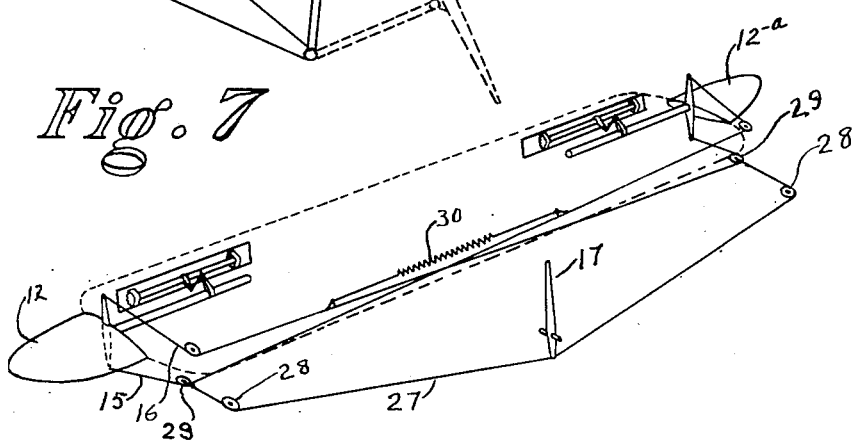
Fig. 8 shows a rolling control mechanism employing ailerons of the floating or feathering type.

In Fig. 8 of the drawings, there is shown a rolling control employing ailerons of the feathering type. In this modification, the ailerons may be connected to the spoiler plates by the same mechanism as shown in Fig. 6. The control cables 15 and 16 are, however, crossed so that the ailerons are constrained to move simultaneously in the same direction and the control lever 17 is connected to a separate cable 27 extending over stationary guide pulleys 28 and connected at its ends to movable pulleys 29 over which the cables 15 and 16 run. Upon actuation of the control lever 17, one of the pulleys 29 is moved rearwardly while the other is permitted to move forwardly causing actuation of the ailerons 12 and 12a in opposite directions from any position which they may occupy.

A spring 30 may be interposed between the cables 15 and 16 adjacent the point where they are crossed and this spring acts to normally hold the ailerons at a positive angle of attack.

In airplane wings equipped with my improved arrangement of lift increasing devices and rolling control elements combined as herein described, high efficiency of the lift increasing elements is obtained, together with satisfactory rolling control throughout a large range of flying attitudes. The lift increasing parts do not interfere with the rolling control elements and the size of one needs not to be compromised with the space required for the proper efficiency of the other. Furthermore, the rolling control devices may be so designed and arranged as to provide advantageous yawing moments when in operation without hampering the efficiency of the lift increasing elements of the wing to which they are attached.

It will thus be seen that I have provided advantageous improvements in lifting surfaces and its rolling control mechanism and, more specifically, in the arrangement or combination of both whereby airplanes can be improved in performance without detriment to rolling control effectiveness.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In an airplane, a wing having a whole span flap of the sliding type at its trailing edge, wing tip ailerons positioned wholly beyond the end of the wing and adjustable lift spoilers adjacent the ends thereof.

2. In an airplane, a wing having a whole span flap of the sliding type, wing tip ailerons and adjustable lift spoilers adjacent the ends thereof, and means for actuating the ailerons and spoilers simultaneously.

3. An airplane having wings provided with ailerons at the tips thereof, each aileron having a supporting shaft mounted in the forward portion of the wing and extending longitudinally thereof, means for imparting rotative movements to said ailerons, spoiler plates mounted in the wings adjacent the forward edges thereof, means connecting the aileron shaft of each wing and the adjacent spoiler plate of the wing for imparting upward movement to the plate as the aileron is moved in a direction to reduce its angle of attack.

4. An airplane having wings provided with pivoted flaps extending substantially the full length of their trailing edges and having ailerons positioned wholly beyond the tips thereof, means for actuating said ailerons, and means for neutralizing the yawing moments due to the operation of said ailerons.

5. In an airplane, a wing having a pivoted flap extending substantially the full length thereof at its trailing edge, and having ailerons positioned wholly beyond the tips thereof, a lift spoiler associated with each aileron, and means for simultaneously actuating the ailerons and spoilers.

6. In an airplane, a wing having ailerons of the feathering type at the tips thereof, and yieldable means acting on the ailerons for normally holding the same at a positive angle of attack.

7. An airplane having wings provided with pivoted flaps extending substantially the full length of their trailing edges and having ailerons positioned wholly beyond the tips thereof, means for actuating said ailerons, and means separate from the ailerons and operated simultaneously therewith for creating yawing moments opposite those due to the operation of the ailerons.

8. An airplane having wings provided with ailerons of the feathering type at the tips thereof, means connecting the ailerons for normally constraining the same to simultaneous movements in the same direction, movable spoiler plates mounted in the wings and operatively connected to the ailerons for operation simultaneously therewith, and manually operable means for moving the ailerons in opposite directions.

9. In an airplane, a wing having spoiler plates adjacent its forward edge, a flap extending along its rear edge and wing tip ailerons of the feathering type, and manually operable means for actuating the spoiler plates and ailerons simultaneously.

10. An airplane having wings provided with ailerons at the tips thereof, adjustable flaps extending along the rear edges of the wings, means for imparting rotative movements to said ailerons, spoiler plates mounted in the wings adjacent the forward edges thereof, means connecting the ailerons of each wing and the spoiler plate of the wing for imparting upward movement to the plate as the aileron is moved in a direction to reduce its angle of attack.

11. An airplane having wings provided with ailerons of the feathering type at the tips thereof, adjustable flaps extending along the rear edges of the wings, means connecting the ailerons for normally constraining the same to simultaneous movements in the same direction, movable spoiler plates mounted in the wings and operatively connected to the ailerons for operation simultaneously therewith, and manually operable means for moving the ailerons in opposite directions.

12. In an airplane, a wing having ailerons of the feathering type positioned wholly beyond the tips thereof, means connecting the ailerons for normally constraining the same to simultaneous movements in the same direction, yieldable means associated with said connecting means for normally holding the ailerons at a positive angle of attack, and manually operable means for moving the ailerons simultaneously in opposite directions.

In testimony whereof I affix my signature.

HERACLIO ALFARO.